US007212652B1

(12) United States Patent
Graham et al.

(10) Patent No.: US 7,212,652 B1
(45) Date of Patent: May 1, 2007

(54) METHOD FOR TRACKING TARGETS WITH HYPER-SPECTRAL DATA

(75) Inventors: Marcus L. Graham, North Kingstown, RI (US); Tod E. Luginbuhi, Portsmouth, RI (US); Roy L. Streit, Portsmouth, RI (US); Michael J. Walsh, Somerset, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 806 days.

(21) Appl. No.: 10/614,433

(22) Filed: Jul. 7, 2003

(51) Int. Cl.
G06K 9/00 (2006.01)
(52) U.S. Cl. .................. 382/103; 382/103; 382/107; 235/411; 348/169
(58) Field of Classification Search ............. 382/103, 382/104, 106, 107; 235/411; 348/169; 250/227.23, 250/203.1
See application file for complete search history.

(56) References Cited

U.S. PATENT DOCUMENTS 5,600,434 A * 2/1997 Warm et al. ........... 356/139.08
6,137,436 A * 10/2000 Koch ........................ 342/73

OTHER PUBLICATIONS

R.L. Streit, "Tracking on Intensity-Modulated Data Stream" NUWC-NPT Technical Report 11,221, Naval Undersea Warfare Center, Division, Newport, Newport, RI May 1, 2000.

R. L. Streit, M.L. Graham and M.J. Walsh, "Tracking in Hyper Spectral Data", Fusion 2002, 5th International Conference on Information Fusion, Annapolis, MD, Jul. 8, 2002-Jul. 11, 2002.
M.J. Walsh, M. L. Graham, R.L. Streit, T.E. Luginbuhl and L.A. Mathews, "Tracking on Intensity Modulated Sensor Data Streams", in proceeding of the 2001 IEEE Aerospace Conference, Bigsky, Montana Mar. 10, 2001-Mar. 17, 2001.
R.L. Streit, M.L. Graham and M.J. Walsh, "Multi-Target Tracking on Intensity Modulated Sensor Data" in proceedings of the SPIE International Aerospace Symposium, Signal Processing, Sensor Fusion and Target Recognition, Orlando FL Apr. 16, 2001-Apr. 20, 2001.
T.E. Luginbuhl and P. Willett, "Tracking a General Frequency Modulated Signal in Noise", Proceedings of the 38th IEEE Conference on Decision and Control, Dec. 1999.

* cited by examiner

*Primary Examiner*—Jingge Wu
*Assistant Examiner*—Shefali Patel
(74) *Attorney, Agent, or Firm*—James M. Kasischke; Jean-Paul A. Nasser; Michael P. Stanley (57) ABSTRACT

In the present invention, the histogram model used in H-PMHT is extended to treat the problem of tracking using hyper-spectral data. Completely general spectral density functions are handled via the use of non-parametric methods. The present invention is not restricted to derivations based on knowledge of the spectral character of the source being tracked. The source spectrum can be estimated in a non-parametric fashion based on an initial track, and this allows the invention to adapt to the source spectrum in situ. The resulting method has improved crossing track performance on sources that have some degree of spectral distinction and will perform no worse than regular H-PMHT on sources that have identical spectral densities.

7 Claims, 3 Drawing Sheets

METHOD FOR TRACKING TARGETS WITH HYPER-SPECTRAL DATA

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

Not applicable.

BACKGROUND OF THE INVENTION (1) Field of the Invention

The present invention relates to remote sensing and remote imaging, and more specifically to a method for processing hyper-spectral remote sensor data for the purpose of displaying the spatial tracks of energy sources in multi-spectral images corresponding to the sensor data.

(2) Description of the Prior Art

Remote sensing of the energy signals of a moving vehicle or energy source for the purposes of tracking the vehicle or energy source has often been accomplished by measuring the intensity of the energy signals with sensors specifically designed to detect energy intensity. In remote sensing applications the sensor is often a planar array of sensing cells, each cell responding to the energy incident on its corresponding section of the array surface. In other applications, such as acoustic sensing, the received energy on sensor elements must be interpreted through a beam forming function to yield energy intensity in a set of spatially directed cells (more commonly called beams). Such a method is designed to track energy peaks as they move over time on the given set of sensor cells. The total broadband energy is plotted and visually displayed. Targets appear as peaks of energy in the display, and are tracked. One method of target tracking based on sensor level data is the Histogram Probabilistic Multi-Hypothesis Tracking (H-PMHT) algorithm. It is an application of the Expectation-Maximization (EM) method of target tracking. It uses a synthetic (multi-dimensional) histogram interpretation of the received power levels in all of the sensor cells. The data for the H-PMHT algorithm usually consists of broadband intensities on a set of spatial sensor cells. The H-PMHT algorithm has its limitations. For example, in situations where more than one target is being tracked and the targets cross paths, the intensity of the energy signals of the targets merge, making it impossible to distinguish the energy between the two targets. In such a situation, the targets must be reacquired by the sensors after they have crossed resulting in a gap and delay in tracking information.

U.S. patent application Ser. No. 10/214,551 to Struzinski teaches a method and system for predicting and detecting the crossing of two target tracks in a bearing versus time coordinate frame. The method/system uses a series of periodic bearing measurements of the two target tracks to determine a bearing rate and a projected intercept with a bearing axis of the bearing versus time coordinate frame. A crossing time $t_c$ for the two target tracks is determined using the tracks' bearing rates and projected intercepts. A prediction that the two target tracks will cross results if a first inequality is satisfied while a detection that the two target tracks have crossed results if a second inequality is satisfied. This method does not, however, address the problem of distinguishing between and identifying the targets before, during and after they have crossed.

There is currently no reliable method by which targets can be consistently tracked and distinguished as they cross paths. What is needed is a method for tracking targets that does not rely solely on broadband energy signal intensity, but also utilizes the spectral aspects of the energy signal, combining both intensity and spectral data so that crossing targets can be tracked provided they have some degree of spectral distinction.

SUMMARY OF THE INVENTION

It is a general purpose and object of the present invention to provide a method for tracking both the spatial sensor data and hyper-spectral sensor data associated with a target.

It is a further purpose to estimate a frequency spectrum for a target contribution that consists of only the target's energy contribution as opposed to the target energy and the noise energy together.

These objects are accomplished with the present invention by taking the histogram model used in H-PMHT and extending it to treat the problem of tracking using hyper-spectral data. In the present invention each measurement scan is now a multi-dimensional array wherein each spatial cell has an associated vector of amplitudes in several (possibly disjoint) spectral cells. The intensity data in the multi-dimensional array is interpreted as the spatial-spectral histogram of a synthetic shot process. A statistical model of the random variation of individual cell intensities from scan to scan is required. The procedure adopted in H-PMHT is to quantize the data vector into a "pseudo-histogram," and then use a multinomial distribution to model the cell counts where the PMHT target mixture model parameterizes the multinomial distribution. The target mixture model determines the cell probabilities that correspond to expected cell counts.

The present invention modifies H-PMHT by using a non-parametric spectral characterization of the energy intensity of the target that is assumed known. The use of such a spectral template enhances low signal to noise ratio (SNR) tracking and allows discrimination of spectrally distinct sources as they cross in the spatial domain. The track solutions from previous batches are used to estimate the (non-parametric) spectral characterization that is used to initiate the generation of the updated solutions as new data is received and processed.

The present invention provides a mechanism for separating the observed hyperspectral energy into the hyperspectral energy for each source (including noise) using the known spectral characteristics for each source. Completely general spectral density functions are handled via the use of non-parametric methods. In the alternative, the source spectrum is estimated in a non-parametric fashion based on an initial track, allowing the algorithm to adapt to the source spectrum in situ.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings depicting an underwater application as the preferred embodiment wherein.

DESCRIPTION OF THE PREFERRED EMBODIMENT

Figure 1:
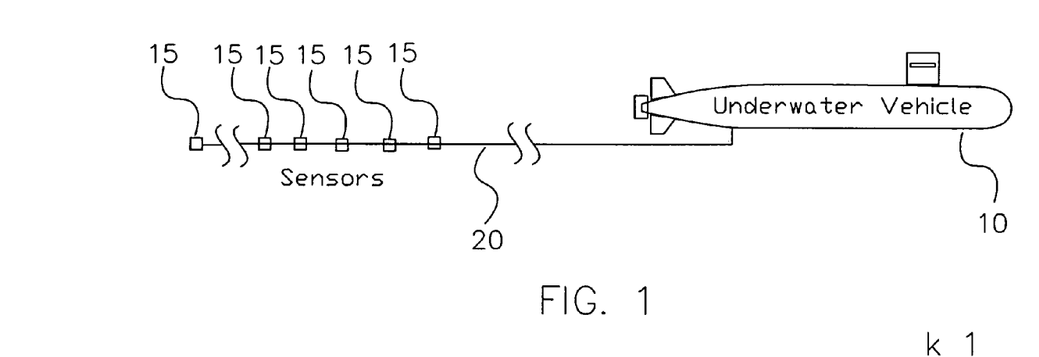
FIG. 1 shows an underwater vehicle towing sensors.
Figure 2:
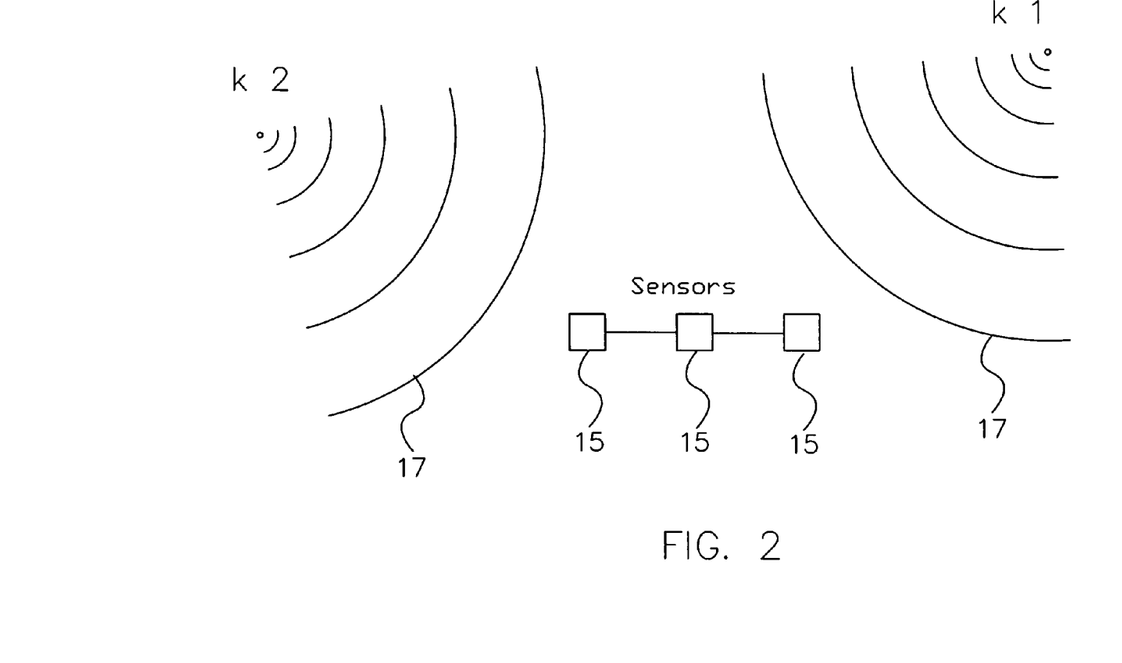
FIG. 2 shows sensors detecting energy from different sources.
Figure 3A:
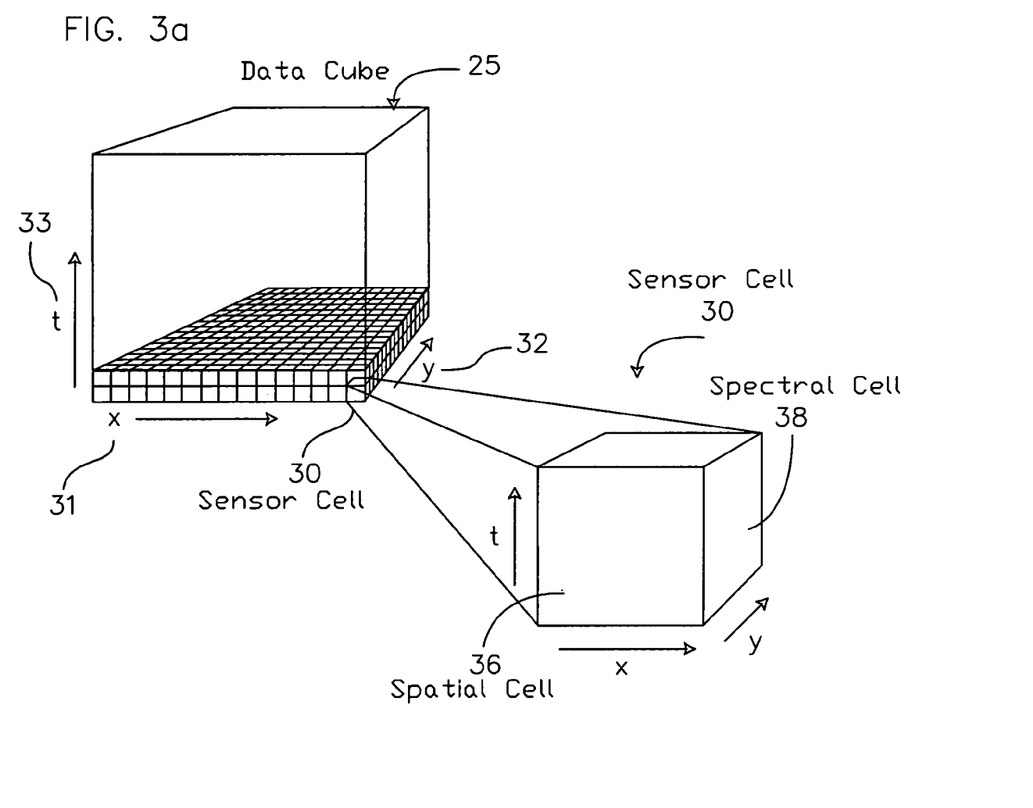
FIG. 3 shows the data cube created after raw sensor data is processed.
Figure 3B:
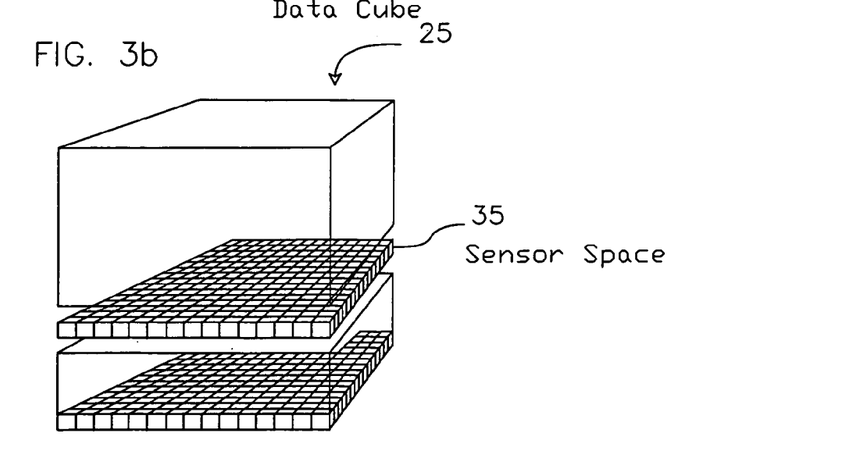

Referring now to FIG. 1 there is shown an underwater vehicle 10 towing an array of sensors 15 arranged on a cable 20. The sensors 15 are of a type known by those skilled in the art of signal processing such as hydrophones. The sensors 15 are capable of detecting energy signals and their intensities from different directions as illustrated in FIG. 2, which shows two vessels labeled $k_1$ and $k_2$ and the energy signals 17 emanating from the vessels. The sensor data from each sensor 15 is transmitted along cable 20 to data processors (not shown) within underwater vehicle 10. The data processors take the raw sensor data and create a data cube 25 as illustrated in FIG. 3. Each such data cube 25 is a collection of smaller cubes referred to as sensor cells 30 which correspond to the processed sensor data generated by the sensors 15. Each sensor cell 30 contains spatial measurements along the x-axis 31, spectral measurements along the y-axis 32 and time measurements along the t-axis 33. The side of each sensor cell 30 contained in the (x,t) plane corresponding to spatial measurement is referred to as a spatial cell 36. The side of each sensor cell 30 contained in the (y,t) plane corresponding to spectral measurement is referred to as a spectral cell 38. The processing and arrangement of the raw sensor data into a data cube 25 composed of multiple sensor cells 30 that are further composed of spatial cells 36 and spectral cells 38 is known by those skilled in the art of signal processing and is achieved by what is often termed beamforming followed by spectral analysis of the beam intensity data using standard discrete Fourier transform (DFT) techniques known in the art. A single layer of the data cube 25 is referred to as a scan of the sensor space 35 as illustrated in FIG. 3.

In the preferred embodiment of the present invention, let $C=\{C_1, \ldots, C_s\}$, $S \geq 1$, denote the collection of all possible sensor cells 30. It is assumed that $C_i \cap C_j = \phi$ for all i and j and that $C_1 \cup \ldots \cup C_s = R^{dim(c)}$, where dim(C) denotes the dimension of the sensor space 35. Furthermore, the sensor cells 30 $C=\{C_1, \ldots, C_s\}$ are the Cartesian products of U disjoint spatial cells 36 $\{D_1 \ldots, D_U\}$ and V disjoint spectral cells 38 $\{\epsilon_1, \ldots, \epsilon_V\}$. This particular choice of spatial 36 and spectral 38 cells is application dependent, but they are intrinsically fixed. The total number of sensor cells 30 in a scan of the sensor space 35 is S=UV, and every cell $C_l$ can be written in the form $$C_l = D_i \times \epsilon_j$$

for some (unique) choice of the cells $D_i$ and $\epsilon_j$. Let $D = D_1 \cup \ldots \cup D_u$ and $\epsilon = \epsilon_1 \cup \ldots \cup \epsilon_V$. The sensor cells 30 from which measurements are available may vary from scan to scan. The sensor cells 30 displayed at time t, for the scan of the sensor space 35, are the Cartesian product of the spatial cells 36 $\{D_1(t), \ldots, D_{U(t)}(t)\}$ and the spectral cells 38 $\{E_1(t), \ldots, E_{V(t)}(t)\}$, so that the $(i,j)^{th}$ sensor cell 30 is $C_{ij}(t) = D_i(t) \times E_j(t)$, where $1 \leq U(t) \leq U$ and $1 \leq V(t) \leq V$. The remaining sensor cells 30 in the scan of sensor space 35 are said to be truncated, and no measurements are collected for these cells at time t.

Let the scan of sensor space 35 at time t be denoted by $$Z_t = \{z_{t,1,1}, \ldots, z_{t,U(t),V(t)}\},$$

where $z_{tij} \geq 0$ is the output of the sensor space 35 at time t in cell $C_{ij}(t)$, i=1, 2, ... U(t), j=1, 2, ... V(t). Let $\bar{h}^2 > 0$ be a specified quantization level, and let $n_{tij}$ denote the quantized value corresponding to the intensity $z_{tij}$ in cell $C_{ij}(t)$, where $$n_{tij} = \left\lfloor \frac{z_{tij}}{\bar{h}^2} \right\rfloor, \quad (1)$$

and $\lfloor x \rfloor$ denotes the greatest integer less than or equal to x. The use of the quantized values $\{n_{tij}\}$ instead of the measurements $\{z_{tij}\}$ is an intermediate step in the development. After deriving the auxiliary function of the H-PMHT algorithm using the synthetic counts $\{n_{tij}\}$, the measurements $\{z_{tij}\}$ are recovered in the limit as $\bar{h}^2 \to 0$.

The "rectangular" spatial-spectral sensor cell structure enables simplifications to the basic equations of H-PMHT. These equations are restated here with the updated notation corresponding to this new cell structure. The cell probability, $P_{ij}$ for the $(i,j)^{th}$ cell 30 takes the form $$P_{ij}(X_t) = \int_{C_{ij}^{(t)}} f(u, v \mid X_t) du, dv, \quad (2)$$

where the sample Probability Density Function (PDF) f(u, v|$X_t$) is defined over all $(u, v) \in R^{dimD} \times R^{dim\epsilon} = R^{dimC}$, by the mixture density $$f(u, v \mid X_t) = \sum_{k=0}^{M} \pi_{tk} G_k(u, v \mid x_{tk}) \quad (3)$$

and where $\pi_{tk}$ is the component mixing proportion, $X_t = \{x_{t0}, \ldots, x_{tM}\}$ are the component spatial state parameters and $G_k(u, v|x_{tk})$ is the component PDF corresponding to target k if $k \geq 1$ and to noise if k=0. The expected sensor space measurement $\bar{z}_{tij}$ takes the form $$\bar{z}_{tij} = \begin{cases} z_{tij} & \begin{cases} 1 \leq i \leq U(t), \\ 1 \leq j \leq V(t), \end{cases} \\ \|z_t\| \frac{P_{ij}(X_t')}{p(X_t')} & \begin{cases} U(t)+1 \leq i \leq U, \\ V(t)+1 \leq j \leq V, \end{cases} \end{cases} \quad (4)$$

where $$\|z_t\| = \sum_{i=1}^{U(t)} \sum_{j=1}^{V(t)} z_{tij}, \quad P(X_t) = \sum_{i=1}^{U(t)} \sum_{j=1}^{V(t)} P_{ij}(X_t), \quad (5)$$

and $X_t'$ is the last estimate of $X_t$. Thus, from (4) it may be seen that expected measurements exist for all cells, even those truncated in the observation. After taking the quantization limit, $\bar{h}^2 \to 0$, the H-PMHT auxiliary functions become $$Q_{t\pi} = \sum_{k=0}^{M} \left[ \sum_{i=1}^{U} \sum_{j=1}^{V} \frac{\bar{z}_{tij}}{P_{ij}(X'_t)} \int_{C_{ij}(t)} G_k(u, v \mid x'_{tk}) \, du \, dv \right] (\pi')_{tk} \log \pi_{tk} \quad (6)$$

and $$Q_{kx} = \sum_{t=1}^{T} \frac{\|z_t\|}{P(X'_t)} \log P_{\Xi_{tk} \mid \Xi_{t-1,k}} (x_{tk} \mid x_{t-1,k}) + \sum_{t=1}^{T} \sum_{i=1}^{U} \sum_{j=1}^{V} \frac{\pi'_{tk} z_{tij}}{P_{ij}(X'_t)} \int_{C_{ij}^{(t)}} G_k(u, v \mid x'_{tk}) \log G_k(u, v \mid x_{tk}) \, du \, dv. \quad (7)$$

The density $P_{\Xi_{tk} \mid \Xi_{t-1,k}}(x_{tk} \mid x_{t-1,k})$ for $t=1, 2, \ldots T$ describes the Markov process for the state of target k.

Let the spectral PDF of target k be denoted by $S_k(v)$, so that $$\int_\varepsilon S_k(v) \, dv = 1. \quad (8)$$

The spectral PDF is equal to the traditional power spectrum normalized so that its integral over $\epsilon$ is one. Because the target spatial and spectral characteristics are independent by assumption, each component $G_k(u, v \mid x_{tk})$ of the sample PDF factors:

$$G_k(u, v \mid x_{tk}) = g_k(u \mid x_{tk}) S_k(v), \quad (9)$$

where $g_k(u \mid x_{tk})$ is the spatial PDF of component k. Independence enables integrals over $C_{ij}(t)$ to be rewritten as products of integrals, so that $$\int_{C_{ij}(t)} G_k(u, v \mid x'_{tk}) \, du \, dv = \int_{E_j(t)} S_k(v) \, dv \int_{D_i(t)} g_k(u \mid x'_{tk}) \, du. \quad (10)$$

and, using the mixture (3) and the definition (2), $$P_{ij}(X'_t) = \sum_{k=0}^{M} \pi'_{tk} \int_{E_j(t)} S_k(v) \, dv \int_{D_i(t)} g_k(u \mid x'_{tk}) \, du. \quad (11)$$

Substituting (10) into (6) gives $$Q_{t\pi} = \sum_{k=0}^{M} \left[ \sum_{i=1}^{U} \Psi_{tki} \int_{D_i(t)} g_k(u \mid x'_{tk}) \, du \right] \pi'_{tk} \log \pi_{tk}, \quad (12)$$

where $$\Psi_{tki} = \left( \sum_{j=1}^{V} \frac{\bar{z}_{tij} \int_{E_j(t)} S_k(v) \, dv}{P_{ij}(X'_t)} \right) \quad (13)$$

is analogous to a normalized matched filter output for target k on spatial cell i at time t, and $P_{ij}(X'_t)$ is given in (11). Similarly, (7) becomes $$Q_{kx} = \sum_{t=1}^{T} \frac{\|Z_t\|}{P(X'_t)} \log p_{\Xi_{t,k} \mid \Xi_{t-1,k}}(x_{tk} \mid x_{t-1,k}) + \sum_{t=1}^{T} \pi'_{tk} \sum_{i=1}^{U} \Psi_{tki} \times \int_{D_i(t)} g_k(u \mid x'_{tk}) \log g_k(u \mid x_{tk}) \, du. \quad (14)$$

There is an additional term in (14), but it is omitted here because it depends on $x'_{t,k}$ and not on $x_{t,k}$, and thus does not influence the M-step of the EM method. It should be noted at this point that it is not necessary to have an analytic expression for $S_k(v)$ to utilize (12) and (14). It is sufficient to know the values of the set of integrals $$\left\{ \int_{E_j(t)} S_k(v) \, dv \right\},$$

$j=1, \ldots V$, for each target k. This vector of spectral cell 38 probabilities is a non-parametric description of the target spectral density sufficient for the problem at hand.

At this stage, specific parametric forms are adopted for the target and measurement processes. For target k, $k=1, \ldots, M$, the process evolution is defined by $$p_{\Xi_{t,k} \mid \Xi_{t-1,k}}(x_{tk} \mid x_{t-1,k}) = N(x_{tk}; F_{t-1,k} x_{t-1,k}, Q_{t-1,k}) \quad (15)$$

where $N(x; \mu, \Sigma)$ is the multivariate normal distribution in x with mean $\mu$ and covariance $\Sigma$. The measurements are characterized by $$g_k(u \mid x_{tk}) = N(u; H_{tk} x_{tk}, R_{tk}). \quad (16)$$

The covariance matrix $R_{tk}$ relates to the spatial extent, or spreading, of the energy about its expected location given by $H_{tk} x_{tk}$. Estimates of $\{\hat{\pi}_{tk}\}$ are obtained using a Lagrange multiplier technique. The result is $$\hat{\pi}_{tk} = \frac{\pi'_{tk}}{\lambda_t} \sum_{i=1}^{U} \Psi_{tki} \int_{D_i(t)} N(u; H_{tk} x'_{tk}, R_{tk}) \, du, \quad (17)$$

where $$\lambda_t = \sum_{k=0}^{M} \pi'_{tk} \left[ \sum_{i=1}^{U} \Psi_{tki} \int_{D_i(t)} N(u; H_{tk} x'_{tk}, R_{tk}) \, du \right] = \sum_{i=1}^{U} \sum_{j=1}^{V} \bar{z}_{tij} \quad (18)$$

The last form follows by taking the sum over k innermost and using Eq. (11).

Estimates for the state variables are obtained by setting the gradient of the auxiliary function $Q_{kX}$ to zero and solving; however, as in the earlier developments of H-PMHT, an alternative approach is taken because it exploits the Kalman filter as an efficient computational algorithm. The details of the Kalman filter steps are omitted here, however, the synthetic spatial measurements used in the filter for target k now have the form $$\tilde{z}_{tk} = \frac{1}{v_{tk}} \sum_{i=1}^{U} \Psi_{tki} \int_{D_i(t)} u N(u; H_{tk} x'_{tk}, R_{tk}) du, \quad (19)$$

where $$v_{tk} = \sum_{i=1}^{U} \Psi_{tki} \int_{D_i(t)} N(u; H_{tk} x'_{tk}, R_{tk}) du. \quad (20)$$

The synthetic process and measurement noise covariance matrices used in conjunction with this synthetic measurement are respectively given by $$\tilde{Q}_{tk} = \frac{P(X'_{t-1})}{\|Z_{t+1}\|} Q_{tk}, \quad 0 \leq t \leq T-1 \quad (21)$$

and $$\tilde{R}_{tk} = \frac{R_{tk}}{\pi'_{tk} v_{tk}}, \quad 1 \leq t \leq T \quad (22)$$

Let $\{\pi_{tk}^l\}$ be the set of estimated mixing proportions and $\{x_{tk}^l\}$ and $\{R_{tk}^l\}$ define the signal states and width parameters at the l-th EM iteration. For simplicity and robustness, assume that $\{\pi_{tk}^l\}=\{\pi_k^l\}$ and $\{R_{tk}^l\}=\{R_k^l\}$ for all t=1, . . . , T in the batch of scans of the sensor space 35. These restrictions, tantamount to statistical stationarity, are most often reasonable over the data intervals of interest. Further, since the spectral density is never itself required, we will denote the needed integrals by $$s_{kj} = \int_{E_j(t)} S_k(v) dv.$$

Figure 4:
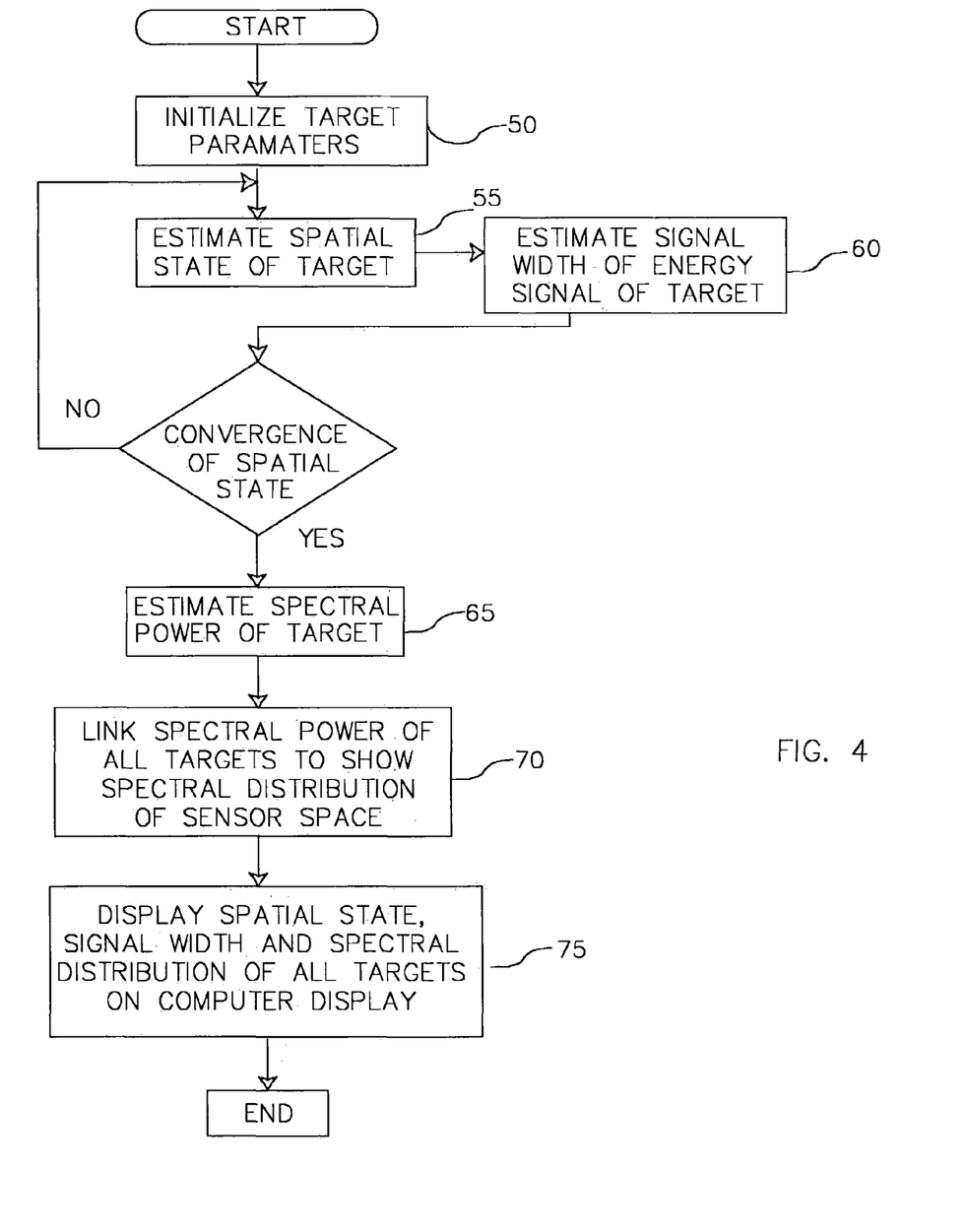
FIG. 4 shows a flow chart of the method.

The method as described below is illustrated in the flow chart in FIG. 4. At the beginning of the method (the 0-th iteration), the mixing proportions $\{\pi_k^{(0)}\}$ are initialized so that $\pi_k^{(0)}>0$ and $\pi_0^{(0)}+\pi_1^{(0)}+\ldots+\pi_M^{(0)}=1$. The signal state sequences $x_k^{(0)}=\{x_{1k}^{(0)}, \ldots, x_{tk}^{(0)}, \ldots, x_{Tk}^{(0)}\}$ are initialized with nominal values for k=1, . . . , M, and the signal widths $\{R_1^{(0)}, R_2^{(0)}, \ldots, R_M^{(0)}\}$ are set nominally above the expected signal widths so that the tracks are better able to "see" nearby energy when poorly initialized. The simple case of $x_k^{(0)}=\{x_{0,k}^{(0)}, \ldots, x_{0,k}^{(0)}, \ldots, x_{0,k}^{(0)}\}$, stationary target), has proven an effective starting point in many cases.

The process covariance matrices $Q_t=\{Q_{t,1}, Q_{t,2}, \ldots, Q_{t,M}\}$ are initialized with values tailored to the problem at hand so as to compromise between smooth tracking and the ability to follow through aberrant behavior. Typically it is assumed that the process covariance matrices are constant over time $Q_t=Q=\{Q_1, Q_2, \ldots, Q_M\}$. In order to get the iterative estimator started, initial values are also required for the target state spectral distributions $S=\{S_1, S_2, \ldots, S_M\}$. The simple case of $$s_k = \left\{ \frac{1}{v}, \frac{1}{v}, \ldots, \frac{1}{v} \right\}$$

has proven an effective starting point for estimating the spectra of spatially isolated targets. The above described initialization of target parameters is step 50 in FIG. 4.

For iterations l=1, 2, . . . , the following quantities are computed:

1. Component spatial cell probabilities for t=1, . . . , T, i=1, . . . , U, and k=0, 1, . . . , M:

$$P_{ki}^{(l)}(X_t) = \begin{cases} 1/U, & k = 0 \\ \int_{D_i} N(\tau; H_{tk} x_{tk}^{(l-1)}, R_{tk}^{l-1}) d\tau, & k \neq 0 \end{cases} \quad (23)$$

2. Component spatial/spectral cell probabilities for t=1, . . . , T and i=1, . . . , U, j=1, . . . V, and k=0, 1, . . . , M:

$$P_{kij}^{(l)}(X_t) = P_{ki}^{(l)}(X_t) S_{kj}. \quad (24)$$

3. Total spatial/spectral cell probabilities for t=1, . . . , T and i=1, . . . , U, j=1, . . . , V:

$$P_{ij}^{(l)}(X_t) = \sum_{k=0}^{M} \pi_{tk}^{(l-1)} P_{kij}^{(l)}(X_t). \quad (25)$$

4. Total scan probabilities for t=1, . . . , T:

$$P_{(X_t)}^{(l)} = \sum_{i=1}^{U} \sum_{j=1}^{V} P_{ij}^{(l)}(X_t). \quad (26)$$

5. Expected sensor space measurement $\bar{z}_{tij}$ for t=1, . . . , T i=1, . . . , U, and j=1, . . . , V using equation (4), 6. Spatial cell first moments for t=1, . . . , T i=1, . . . , U, and k=1, . . . , M:

$$\mu_{tki}^{(l)} = \int_{D_i} \tau N(\tau; H_{tk} x_{tk}^{(l-1)}, R_{tk}^{(l-1)}) d\tau. \quad (27)$$

7. Relative mode contributions for t=1, . . . , T and k=0, 1, . . . , M:

$$v_{tk} = \sum_{i=1}^{U} \sum_{j=1}^{V} \frac{z_{tij} P_{kij}^{(l)}(X_t)}{P_{ij}^{(l)}(X_t)}. \quad (28)$$

8. Estimated mixing proportions for t=1, . . . , T and k=0, 1, . . . , M:

$$\pi_{tk}^{(l)} = \frac{\pi_{tk}^{(l-1)} v_{tk}}{\sum_{k'=0}^{M} \pi_{tk'}^{(l-1)} v_{tk}} \quad (29)$$

9. Synthetic measurements for t=1, . . . , T and k=1, . . . , M:

$$\tilde{z}_{tk}^{(l)} = \frac{1}{v_{tk}} \sum_{i=1}^{U} \sum_{j=1}^{V} \frac{z_{tij} S_{kj} \mu_{tki}^{(l)}}{P_{ij}^{(l)}(X_t)} \quad (30)$$

10. Synthetic measurement covariance matrices for t=1, . . . , T and k=1, . . . , M:

$$\tilde{R}_{tk}^{(l)} = \frac{R_{tk}^{(l-1)}}{\pi_{tk}^{(l-1)} v_{tk}}. \quad (31)$$

11. Synthetic process covariance matrices for t=0, 1, . . . , T−1 and k=1, . . . , M:

$$\tilde{Q}_{tk}^{(l)} = \frac{P^{(l)}(X_t)}{\|z_t\|} Q_{tk}, \quad (32)$$

where $Q_{tk}$ is treated as a control parameter for the process description, and most commonly $Q_{tk}=Q_k$ for all t=1, . . . , T in the batch.

12. Estimated spatial states 55 in FIG. 4 $x^{(l)} = \{x_{01}^{(l)}, \ldots, x_{tk}^{(l)}, \ldots, x_{TM}^{(l)}\}$ for t=0, 1, . . . , T and k=1, . . . , M, using (for computational efficiency) a recursive Kalman smoothing filter, on the synthetic data $\tilde{z}_{tk}^{(l)}$ with process and measurement matrices corresponding to $F_{tk}, \tilde{Q}_{tk}^{(l)}, H_{tk}, \tilde{R}_{tk}^{(l)}$.

13. Spatial cell second moments for t=1, . . . , T, i=1, . . . , U. and k=1, . . . , M:

$$\sigma_{tki}^{(l)} = \int_{D_i} (\tau - H_{tk} x_{tk}^{(l-1)})^2 N(\tau; H_{tk} x_{tk}^{(l-1)}, R_{tk}^{(l-1)}) d\tau. \quad (33)$$

14. Average signal width estimates 60 in FIG. 4 for k=1, . . . , M:

$$R_k^{(l)} = \left(\frac{1}{\sum_{t=1}^{T} v_{tk}}\right) \sum_{t=1}^{T} \sum_{i=1}^{U} \sum_{j=1}^{V} \frac{z_{tij} S_{kj} \sigma_{tki}^{(l)}}{P_{ij}^{(l)}(X_t)}. \quad (34)$$

At the completion of iterations l the estimated signal states $x^{(l)}$ and their width estimates $R^{(l)} = \{R_1^{(l)}, R_2^{(l)}, \ldots, R_M^{(l)}\}$ constitute the track estimate output.

15. Using the track estimate output, compute the average synthetic spectral power 65 in FIG. 4 for j=1, . . . , V, and k=1, . . . , M:

$$\hat{S}_{kj} = \left(\frac{1}{T}\right) \sum_{t=1}^{T} \frac{1}{v_{tk}} \sum_{i=1}^{U} \frac{z_{tij} P_{kij}^{(l+1)}(X_t)}{P_{ij}^{(l+1)}(X_t)} \quad (35)$$

(Note from (35) that $$\sum_{j=1}^{V} S_{kj} \equiv 1.$$

The resulting combination of processed spatial, signal width and spectral estimates are linked chronologically 70 and displayed as an image on a computer display screen 75 using display methods known in the art.

The advantages of the present invention over the prior art are that the resulting method has improved crossing track performance on sources that have some degree of spectral distinction. The present invention also avoids the need for thresholding and peak-picking to produce point measurements.

The spectral estimates (35) may be used to initiate this estimator when run on subsequent batches of data. In the preferred embodiment as a new scan is received the oldest scan of the batch is dropped and the estimation method including the steps 1 through 14 (formulae (23) through (35)) as stated above is run in "sliding batch" fashion using the batch length that provides sufficient smoothing without being unnecessarily long. In this case, t in the equations represents the time index within the batch under consideration. The track and spectral estimates from the previous batch are used as initial values to start the iterations as outlined.

The target specific spectral estimates (35) constitute outputs unto themselves and can be easily computed for arbitrary track sequences x' and R' used in place of $x^{(l)}$ and $R^{(l)}$. The resulting spectral estimates have been termed "track conditioned spectral estimates," and they serve to give a spectral characterization to tracks generated via other means.

Obviously many modifications and variations of the present invention may become apparent in light of the above teachings. For example: $g_k(u/x_{tk})$ may take a parametric form other than the normal density given in (16), $g_0(u)$ may be other than the uniform density as implied by (23). While it was shown here that the spectrum could be handled in a non-parametric form, the methods are readily extended to treat a parametric spectral description.

In light of the above, it is therefore understood that within the scope of the appended claims, the invention may be practiced otherwise than as specifically described.

What is claimed is:

1. A method for estimating a target specific spectral distribution on at least one target over a period of at least one time measurement in a sensor space having at least one spatial cell and at least one spectral cell comprising:
   providing a spectral probability density function;
   calculating the component spatial cell probabilities for each said time measurement, for each said target and for the total number of said spatial cells;
   calculating the combined component spatial and spectral cell probabilities by taking the matrix outer product of said component spatial cell probabilities and said provided spectral probability density function for each said target;

summing said combined component spatial and spectral cell probabilities for all said targets to obtain a total combined spatial and spectral cell probability for all said targets;

summing said total combined spatial and spectral cell probabilities for all said targets over all spectral cells and all spatial cells to obtain a total sensor space probability;

calculating an expected sensor space measurement for all spectral cells and all spatial cells;

determining the relative mode contributions for all said targets using the combined component spatial and spectral cell probabilities and the total combined spatial and spectral cell probability for all said targets;

calculating the average spectral power on each said target using the relative mode contributions for all targets, the expected sensor space measurement for all spectral cells and spatial cells, the combined component spatial and spectral cell probabilities and the total combined spatial and spectral cell probability for all said targets over all time measurements;

linking all of the average spectral powers of all of the targets to obtain a spectral distribution estimate for each of the targets; and displaying said spectral distribution estimates on a computer display screen for each said target.

2. A method for tracking at least one target over a period of at least one time measurement using batches of data obtained from sensors designed to detect energy signals from said target in a sensor space having at least one spatial cell and at least one spectral cell comprising:

initializing an estimated mixing proportion for each said target;

initializing an expected signal width of the energy signal of each said target;

initializing a process covariance matrix for each said target;

initializing a spectral estimate of the energy signal of each said target;

providing a spectral probability density function;

calculating the component spatial cell probabilities for each said time measurement, for each said target and for the total number of said spatial cells using said spatial state of said target and said estimated signal width of said target;

calculating the combined component spatial and spectral cell probabilities by taking the matrix outer product of said component spatial cell probabilities and said provided spectral probability density function for each said target;

summing said combined component spatial and spectral cell probabilities for all said targets to obtain a total combined spatial and spectral cell probability for all said targets;

summing said total combined spatial and spectral cell probabilities for all said targets over all spectral cells and all spatial cells to obtain a total sensor space probability;

calculating an expected sensor space measurement from said total combined spatial and spectral cell probability for all said targets and from said total sensor space probability, for all spectral cells and all spatial cells;

computing a spatial cell first order moment for all said targets for each spatial cell in said sensor space using the expected signal width of the energy signal of each said target and the spatial state of each said target;

determining the relative mode contributions over all time measurements for each target using all of the combined component spatial and spectral cell probabilities and the total combined spatial and spectral cell probabilities for all said targets;

calculating estimated mixing proportions for each target using the relative mode contributions of each said target;

formulating a synthetic spatial measurement based on the expected sensor space measurement, the total combined spatial and spectral cell probability for all targets, the combined spatial and spectral cell probability for each said target, and the relative mode contribution of each said target;

formulating at least one synthetic covariance matrix for said synthetic spatial measurement by taking a product of the estimated mixing proportions and the relative mode contributions for each said target and dividing the product by the expected signal width of the energy signal of the target;

formulating at least one synthetic process covariance matrix based on said total sensor space probability;

calculating a spatial state for each said target through the use of a recursive Kalman smoothing filter on the synthetic spatial measurement, the synthetic covariance matrix and the synthetic process covariance matrix of each said target;

computing a spatial cell second order moment for each said targets for each spatial cell in said sensor space using the expected signal width of the energy signal of each said target and the spatial state of each said target;

determining signal width estimates for each target using the spatial cell second order moments for each said target, the spectral estimate of the energy signal of each said target, the total combined spatial and spectral cell probability for all said targets the expected sensor space measurement for all spectral cells and all spatial cells, and relative mode contributions over all time measurements;

repeating the previous steps beginning with said step of calculating the component spatial cell probabilities, until there is a convergence in the spatial state for all said targets;

calculating the average spectral power on each said target using the relative mode contributions for all targets, the expected sensor space measurement for all spectral cells and spatial cells the combined component spatial and spectral cell probabilities and the total combined spatial and spectral cell probability for all said targets over all time measurements;

linking the average spectral power on all of the targets to obtain a spectral distribution estimate for each of the targets; and displaying said spatial state, signal width estimate and spectral distribution estimate on a computer display screen for each said target.

3. A method according to claim 2 wherein the spectral distribution estimates, and the resulting spatial states serve as initialization points for the processing of a subsequent batch of sensor data.

4. A method according to claim 2 wherein the iterations of steps beginning with said step of calculating the component spatial cell probabilities, is iterated for a predetermined minimum number of iterations.

5. A method according to claims 2 wherein said calculating the component spatial cell probabilities for each said time, for each said target and for the total number of said spatial cells further comprises:

$$P_{ki}^{(l)}(X_t) = \begin{cases} 1/U, & k = 0 \\ \int_{D_i} N(\tau; H_{tk} x_{tk}^{(l-1)}, R_{tk}^{(l-1)}) d\tau, & k \neq 0 \end{cases}.$$

6. A method according to claim 2 wherein said computing a spatial cell first order moment for all said targets for each spatial cell in said sensor space further comprises:

$$\mu_{tki}^{(l)} = \int_{D_i} \tau N(\tau; H_{tk} x_{tk}^{(l-1)}, R_{tk}^{(l-1)}) d\tau.$$

7. A method according to claim 2 wherein said computing a spatial cell second order moment for each said targets for each spatial cell in said sensor space further comprises:

$$\sigma_{tki}^{(l)} = \int_{D_i} (\tau - H_{tk} x_{tk}^{(l-1)})^2 N(\tau; H_{tk} x_{tk}^{(l-1)}, R_{tk}^{(l-1)}) d\tau.$$

* * * * *

UNITED STATES PATENT AND TRADEMARK OFFICE
CERTIFICATE OF CORRECTION

PATENT NO.       : 7,212,652 B1                                    Page 1 of 1
APPLICATION NO.  : 10/614433
DATED            : May 1, 2007
INVENTOR(S)      : Graham et al.

It is certified that error appears in the above-identified patent and that said Letters Patent is hereby corrected as shown below:

Title Page; item (75); please change "Tod E. Luginbuhi" to --Tod E. Luginbuhl--.

Signed and Sealed this

Twenty-ninth Day of April, 2008

JON W. DUDAS
*Director of the United States Patent and Trademark Office*